(12) United States Patent
Matsukawa

(10) Patent No.: US 6,839,085 B1
(45) Date of Patent: Jan. 4, 2005

(54) IMAGE PICKUP APPARATUS FOR HIGH-SPEED PHOTOGRAPHING AND METHOD OF CONTROLLING THE SAME

(75) Inventor: Nobuyuki Matsukawa, Yokosuka (JP)

(73) Assignee: Victor Company of Japan, Ltd., Kanagawa-Ken (JP)

(*) Notice: Subject to any disclaimer, the term of this patent is extended or adjusted under 35 U.S.C. 154(b) by 785 days.

(21) Appl. No.: 09/644,859

(22) Filed: Aug. 24, 2000

(30) Foreign Application Priority Data

Aug. 24, 1999 (JP) .......................................... 11-236627

(51) Int. Cl.[7] .............................. H04N 9/64; H04N 3/14
(52) U.S. Cl. ...................................... 348/243; 348/312
(58) Field of Search ............................ 348/207.99, 241, 348/243, 311, 312, 220.1–222.1, 229.1, 230.1, 250, 294, 296–298, 607, 615, 618, 619, 622; 382/270, 271, 272, 274, 275; 358/463, 465, 466

(56) References Cited

U.S. PATENT DOCUMENTS

| | | | | |
|---|---|---|---|---|
| 4,903,144 A | * | 2/1990 | Stefanik et al. | 358/461 |
| 5,111,311 A | * | 5/1992 | Yamamoto | 358/461 |
| 5,608,455 A | * | 3/1997 | Oda | 348/295 |
| 5,659,355 A | * | 8/1997 | Barron et al. | 348/248 |
| 6,061,092 A | * | 5/2000 | Bakhle et al. | 348/243 |
| 6,084,634 A | * | 7/2000 | Inagaki et al. | 348/294 |
| 6,525,769 B1 | * | 2/2003 | Thomas et al. | 348/243 |

FOREIGN PATENT DOCUMENTS

JP 11-8780 1/1999 ............ H04N/5/16

* cited by examiner

*Primary Examiner*—Ngoc-Yen Vu
(74) *Attorney, Agent, or Firm*—Jacobson Holman

(57) ABSTRACT

An image apparatus has a light-receiving section and a light-blocking section. The light-receiving section receives light from an object to generate an analog video signal. The light-blocking section blocks the light to generate reference signals. The analog video signal is converted into a digital video signal. The reference signals are accumulated a predetermined number of times from a predetermined accumulation starting point on scanning lines forming an image of the object for a specific period. The accumulated signal is averaged to generate an average signal. A reference level of the digital video signal is adjusted based on the average signal so that the difference between the digital video signal and the average signal becomes zero. The number of times for accumulation is decided as $2^n$ that is smaller than a specific number "m", of the scanning lines for forming the image of the object. The accumulation starting point is decided as $(m-2^n)/2$, "n" and "m" being positive integers.

1 Claim, 5 Drawing Sheets

IMAGE PICKUP APPARATUS FOR HIGH-SPEED PHOTOGRAPHING AND METHOD OF CONTROLLING THE SAME

BACKGROUND OF THE INVENTION

The present invention relates to an image pickup apparatus. Particularly, this invention relates to an image pickup apparatus, such as, a video camera equipped with a charge-coupled device (CCD).

A charge-coupled device used for video cameras has a light-receiving section 100 and a light-blocking section 101, arranged as shown in FIG. 1A.

The light-receiving section 100 receives light from an object via lens to generate an analog video signal which is converted into a digital video signal by analog-to-digital conversion.

On the other hand, the light-blocking section 101 blocks the light by an aluminum plate, for example. The light-blocking section 101 is also provided with a horizontal black-reference detector to detect horizontal optical-black (OB) data.

The OB data is a black-reference (optical black) signal for indicating reference of optical black used for displaying pictures. The black-reference signal is used to clamp the reference level of the digital video signal for achieving a high reference-level stability.

The OB data is supplied to a digital processor installed in a video camera. The digital processor accumulates the OB data in the horizontal direction and calculates the average value of the accumulated OB data for each predetermined number of pixels in the horizontal direction. The digital processor further accumulates the average values in the vertical direction and calculates the average value of the accumulated average values for each predetermined number of pixels in the vertical direction. The average value obtained in the vertical direction is output as the final OB data.

The number of scanning lines for accumulation in the vertical direction is 128 lines for television signals according to the NTSC (National Television System Committee) system.

In detail, as illustrated in FIG. 1B, the OB data are accumulated for each group of Nh pixels (Nh=16, for example) after N pixels from the rising edge of a horizontal synchronizing signal (HD) for calculation of the average value of the OB data in the horizontal direction.

The calculation of average value in the horizontal direction starts at the Y-th line after the rising edge of a vertical synchronizing signal (VD), and the calculation of average value in the vertical direction starts at the Nv-th line (Nv= 128, for example) after the Y-th line.

Performance specifications of a driver to drive the CCD decides at which clock after the rising edge of the HD the OB data calculation starts in the horizontal direction and after how many HDs from the VD the OB data calculation starts in the vertical direction.

The number of times for accumulation in the horizontal direction is preferably smaller than the number of pixels located in the light-blocking section 101 and the accumulation is preferably applied to pixels the number of which is $2^n$ (n: a positive integer). Moreover, the accumulation in the horizontal direction preferably starts at the m-th line (m: a positive integer) so that the accumulation can be applied to the center pixels from which the OB data can be detected on the light-blocking section 101.

The accumulation in the vertical direction is, for example, applied to 128 lines as discussed. The number "128" is the maximum number of lines because the value that comes next to 128 (=$2^7$) is 256 (=$2^8$) that is larger than the number of scanning lines for TV signals according to the NTSC system. Moreover, the accumulation in the vertical direction preferably starts after several lines from the rising edge of the VD so that the accumulation can be applied to the center pixels from which the OB data can be detected on the light-blocking section 101.

The values Nh and Nv discussed above are preferably $2^n$ because division in digital processing can be performed by rounding-down of $2^n$. The average value of OB data on pixels in the light-blocking section 101 (16≦pixels≦32, for example) is obtained by accumulation on 16 pixels and rounding-down of the lower 4 bits of the accumulated data. The average value for pixels equal to 32 or more can be obtained by accumulation for the 32 pixels and 5-bit shifting of the accumulated data.

The digital video signal and the OB data obtained as above are supplied to a digital processor for obtaining the difference between the digital signal and data and performing digital clamping processing to cancel the difference. In other words, the reference (black) level of the digital video signal is adjusted on the basis of the OB data.

One type of video cameras that has recently been on the market is capable of high-speed photographing in which signals are read from the CCD several times for one field period (VD) for photographing several pictures within one field period.

Such a high-speed photographing mode further accumulates the horizontal OB data obtained as discussed above in the vertical direction to calculate average OB data for further accurate black level adjustments for pictures.

However, the digital clamping processing discussed above cannot be applied to such a high-speed photographing-type of video cameras for several reasons.

Digital clamping processing for video data of "n" pictures within one field period (VD), for which signals are read from CCD several times for one VD from the present vertical synchronizing signal to the succeeding synchronizing signal, would generate noises on the period of OB data to one video data per one VD, which overlaps the period of "n" video data per one VD.

Moreover, the larger the number "n", the shorter the period of digital clamping processing for video data of "n" pictures per one VD. High-speed CPUs are thus required for such high-speed digital clamping processing.

High-speed CPUs, however, consume a lot of power to generate heat; and hence require cooling mechanism, thus causing difficulty in compactness of camera size, shortage of battery life-time, and cost-up in fabrication.

SUMMARY OF THE INVENTION

A purpose of the present invention is to provide an image pickup apparatus and a method of controlling the image pickup apparatus that offer accurate digital clamping processing for, for example, high-speed photographing, without high-speed CPUs.

The present invention provides an image pickup apparatus. The apparatus has an image pickup device having a light-receiving section to receive light from an object to generate an analog video signal, and a light-blocking section to block the light to generate reference signals. The apparatus also has an analog-to-digital converter to convert the analog video signal into a digital video signal; a processor to accumulate the reference signals a predetermined number of times from a predetermined accumulation starting point on scanning lines forming an image of the object for a specific period and average the accumulated signal to generate an average signal; and an adjuster to adjust a reference level of the digital video signal based on the average signal so that the difference between the digital video signal and the average signal becomes zero.

Furthermore, the present invention provides a method of controlling an image apparatus having a light-receiving section and a light-blocking section. Light is received from an object by the light-receiving section to generate an analog video signal. The light is blocked by the light-blocking section to generate reference signals. The analog video signal is converted into a digital video signal. The reference signals are accumulated a predetermined number of times from a predetermined accumulation starting point on scanning lines forming an image of the object for a specific period. The accumulated signal is averaged to generate an average signal. A reference level of the digital video signal is adjusted based on the average signal so that the difference between the digital video signal and the average signal becomes zero.

Moreover, the present invention provides a method of controlling an image apparatus having a light-receiving section and a light-blocking section. Light is received from an object by the light-receiving section to generate a plurality of analog video signals for a first field period. The light is blocked by the light-blocking section to generate reference signals for each analog video signal. The analog video signals are converted into digital video signals. The reference signals are accumulated for each digital video signal to generate a first accumulated signal. The first accumulated signal is averaged to generate a first average signal. The first average signal is accumulated for all the video signals for a second field that follows the first field period to generate a second accumulated signal. The second accumulated signal is averaged to generate a second average signal. A reference level of each digital video signal is adjusted based on the second average signal so that the difference between the digital video signals and the second average signal becomes zero.

DETAILED DESCRIPTION OF PREFERRED EMBODIMENTS

Preferred embodiments according to the present invention will be disclosed with reference to the attached drawings.

Figure 1A:
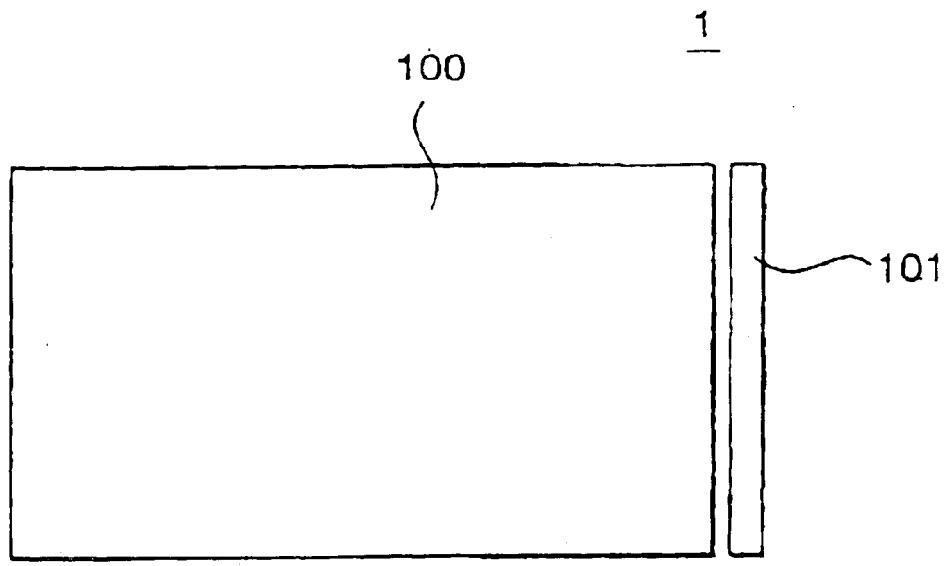
FIG. 1A illustrates CCD arrangements for video cameras.
Figure 1B:
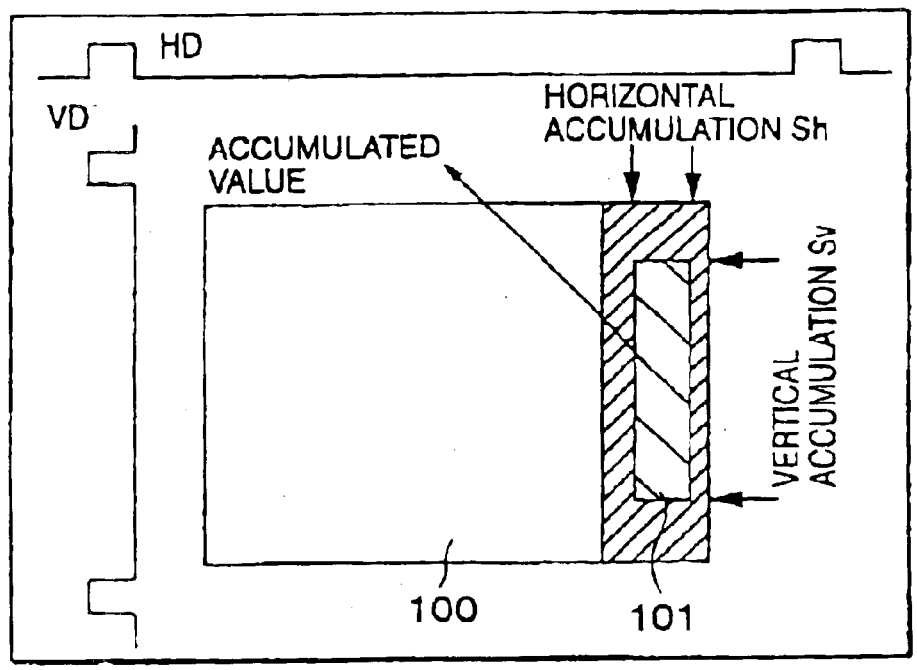
FIG. 1B explains optical black data calculation.
Figure 2:
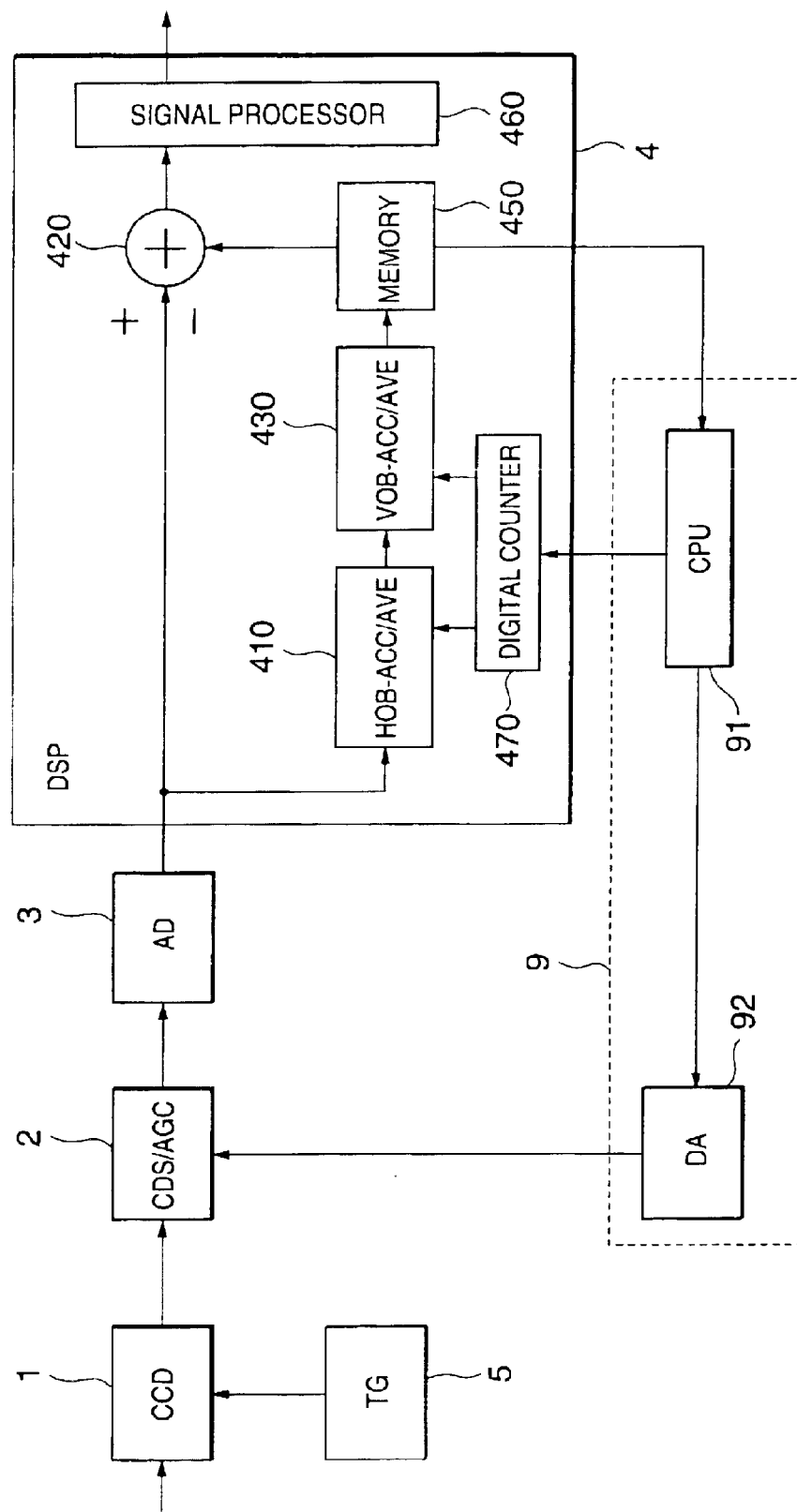
FIG. 2 shows a block diagram of a preferred embodiment of an image pickup apparatus according to the present invention.

FIG. 2 shows a block diagram of a preferred embodiment of an image pickup apparatus according to the present invention.

A charge-coupled device (CCD) 1 driven by a driver (TG) 5 picks up images of an object to generate an image signal. The image signal is supplied to a correlation double-sampling/automatic gain control (CDS/AGC) section 2 for noise-rejection by correlation double-sampling and amplifying the noise-rejected signal with a predetermined gain, to output an analog video signal. The analog video signal is converted into a digital video signal by an analog-to-digital converter (AD) 3.

The digital video signal is supplied to a digital processor (DSP) 4 for signal processing which will be described later in detail.

Optical black (OB) data obtained by the DSP 4 is supplied to a controller 9. The OB data is processed by a CPU 91 within a predetermined range and supplied to a digital-to-analog (DA) converter 92. The DA converter 92 generates an analog signal that is supplied to the CDS/AGC 2 for offset voltage adjustments. The CDS/AGC 2 performs calculation on OB data supplied by the CCD 1 under the adjusted offset voltage.

The offset voltage adjustments are repeatedly performed by the loop of the CDS/AGC 2, AD3 and DSP 4 to adjust OB data to be supplied to the DSP 4 within a predetermined range.

The digital video signal that has been supplied to the DSP 4 is supplied to a horizontal OB data accumulation/averaging (HOB-ACC/AVE) section 410 and also a calculator 420.

The HOB-ACC/AVE 410 accumulates OB data in the horizontal direction and averaging the accumulated data according to calculation information supplied by the CPU 91. In other words, the HOB-ACC/AVE 410 accumulates the OB data in the horizontal direction and averaging the accumulated data while the OB data are read from the CCD 1.

This processing is explained in detail with reference to FIG. 3.

Figure 3:
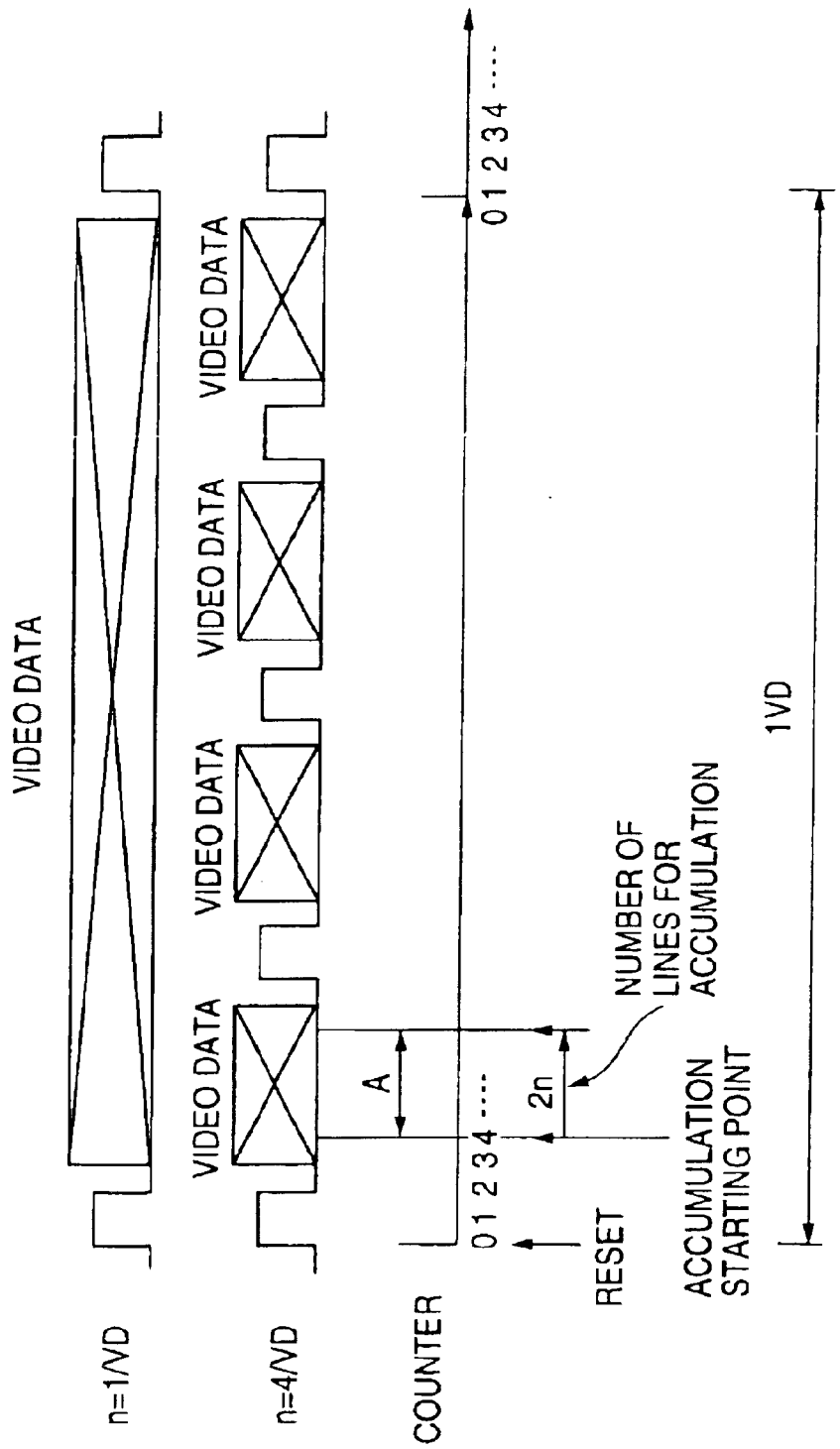
FIG. 3 is a timing chart explaining an embodiment of digital clamping processing according to the present invention.

FIG. 3 illustrates four (n=4) video data within one field period (VD) from the present to the succeeding vertical synchronizing signals.

The CPU 91 supplies data of accumulation starting point and the number of scanning lines (times of) for accumulation to the HOB-ACC/AVE 410 via a digital counter 470 to calculate an average OB data in the horizontal direction. The digital counter 470 will be explained later in detail.

The average OB data is supplied to a vertical OB data accumulation/averaging (VOB-ACC/AVE) section 430. The VOB-ACC/AVE 430 accumulates the average OB data in the vertical direction and calculates an average OB data in the vertical direction according to data of accumulation starting point and the number of lines for accumulation supplied by the CPU 91. The average OB data in the vertical direction is supplied to a memory 450.

The accumulation starting point and the number of scanning lines for accumulation are decided according to the performance specifications of the TG 5, as already described.

Suppose that OB data appears after 22 lines from the rising edge of a vertical synchronizing signal and disappears after 68 lines under the control of the TG 5.

One picture consists of 46 lines (=68−22); and hence the number of lines for accumulation is 32 according to the following table:

| NLV | 2 | 4 | 8 | 16 | 32 | 64 | 128 |
|-----|---|---|---|----|----|----|-----|
| AS  | 1 | 2 | 3 | 4  | 5  | 6  | 7   | where NLV is the number of lines to be added in the vertical direction, and AS is the amount of shifting (which will be explained later).

The accumulation starting point is decided as follows:
(46−32)/2=7 (so that the range of accumulation comes to the center of picture);
then, the starting point is 22+7=29.

The OB data stored in the memory 450 is supplied to the calculator 420 at the succeeding vertical synchronizing signal (VD) and subtracted from the digital video signal supplied by the AD 3. An output signal of the calculator 420 is processed by a signal processor 460 and output from the image pickup apparatus.

The processing is performed so that the output signal indicating the difference between the OB data and digital video signal becomes zero as much as possible. Accordingly, the reference (black) level of the digital video signal is set according to the OB data.

New OB data is obtained for the further succeeding vertical synchronizing signal and stored in the memory 450 in place of the former OB data for updating.

The DSP 4 performs digital clamping processing to set the reference level of the video signal output from the CCD 1 according to the OB data (black reference signal).

The digital clamping processing is performed as follows:
Horizontal OB data included in the digital video signal supplied by the AD 3 is processed by the HOB- and VOB-ACC/AVEs 410 and 430 to obtain the average OB data. The difference between the digital video signal and the average OB data is obtained by the calculator 420. The average OB data supplied to the calculator 420 from the memory 450 is adjusted so that the difference becomes zero as much as possible.

The average OB data obtained by the DSP 4 is supplied to the CPU 91 and processed so that it is within a predetermined range. The processed data is supplied to the DA 92 for analog signal generation. The analog signal is supplied to the CDS/AGC 2 for offset voltage adjustments. The CDS/AGC 2 processes the succeeding OB data supplied by the CCD 1 according to the adjusted offset voltage. The offset voltage adjustments are repeatedly performed by the loop of the CDS/AGC 2, AD 3, DSP 4 and controller 9 so that OB data supplied to the DSP 4 is adjusted within a predetermined range.

The accumulation starting point setting for the HOB- and VOB-ACC/AVEs 410 and 430 via the digital counter 470 is disclosed in detail.

The digital counter 470 is reset at the rising edge of each vertical synchronizing signal to start counting. The count value is used for accumulation starting point setting. Another digital counter that is reset at the falling edge of each vertical synchronizing signal, for example, can also be used.

As explained with reference to the table shown above, setting the number of lines for OB data accumulation as $2^n$ allows average OB data calculation by bit-shifting designated by the CPU 91.

The number "128" is the maximum number of lines because the value that comes next to 128 ($=2^7$) is 256($=2^8$) is larger than the number of scanning lines for TV signals according to the NTSC system, as already explained.

The average OB data calculation is performed by bit-shifting with $2^n$ because the amount of shifting "1" means division with a divisor 2 ($=2^1$), and the amount of shifting "2" means division with a divisor 4 ($=2^2$) in the shown in above. In other words, the amount of shifting "n" in the table means division with a divisor $2^n$.

When several video data exist within one VD as shown in FIG. 3, the amount of shifting is decided according to the number of lines for the several video data. For example, when the number of lines for the several video data is 80, the number of lines to be added in the vertical direction (NLV) is 64 and the amount of shifting (As) is 6; furthermore, when the number of lines for the several video data is 63, the NLV is 32 and the AS is 5, according to the table shown in above.

As disclosed, designation of the accumulation starting point and the number of lines for accumulation by the CPU 91 provides accurate digital clamping data for a digital video signal carrying a plurality of video data within one VD.

Moreover, designation of the accumulation starting point and the number of lines for accumulation by the CPU 91 provides accurate digital clamping data for a digital video signal that carries one video data within one VD, and is in synchronism with the vertical synchronizing signal.

Figure 4:
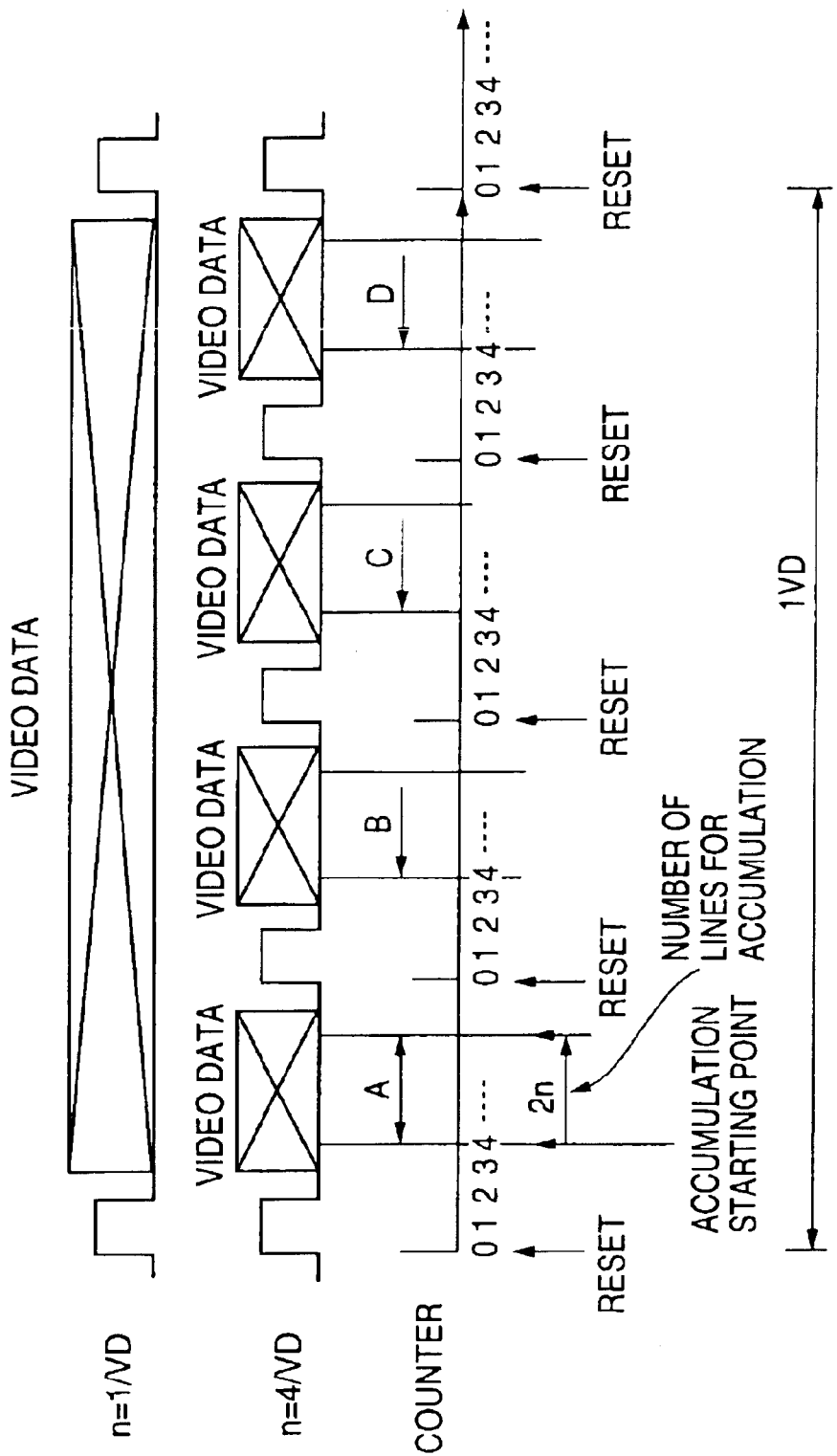
FIG. 4 is a timing chart explaining another embodiment of digital clamping processing according to the present invention.

Disclosed next with reference to FIG. 4 is that the digital counter 470 is reset at the rising edge of vertical synchronizing signals that appear four times (n=4) within one VD. Compared to FIG. 3, the digital counter 470 is reset for each digital video signal. Accordingly, the digital counter 470 is reset "n" times for one VD.

FIG. 4 illustrates the processing at n=4; and hence OB data is obtained four times in total for the periods A, B, C and D. The OB data obtained over the periods are accumulated and averaged for obtaining average OB data.

The average OB data is stored in the memory 450 and controlled according to the difference between the average OB data and the digital video signal that appears for the succeeding one VD for digital clamping processing.

In detail, all the OB data that appear for one VD are accumulated and averaged for obtaining the first average data in the horizontal direction. The average data is further accumulated and averaged for obtaining the second average data in the vertical direction. The second average data is used for setting the reference (black) level of a digital video signal that appears for another VD that follows the VD for which the second average data has been obtained, for providing an accurate count value to the digital counter 470 to achieve further accurate digital clamping processing.

FIG. 4 illustrates accumulation and averaging of OB data for the periods A, B, C and D. However, not only this, but also, another processing, such as, accumulation and averaging of OB data for portions of the periods A and B, A and C, and A and D; A and D; A, B and C; B and C; B and D; B, C and D; C and D, can be applied to digital clamping processing for reference (black) level setting for digital video signals.

Moreover, for digital clamping processing for a digital video signal carrying "n" number of video data for one VD that have been read "n" times from the CCD 1 by high-speed photographing, designation of accumulation starting point and the number of lines for accumulation by the CPU 91 offers accurate digital clamping processing. Setting the number of lines for accumulation to 2' offers bit-shifting for OB data averaging, thus achieving simple processing.

Figure 5:
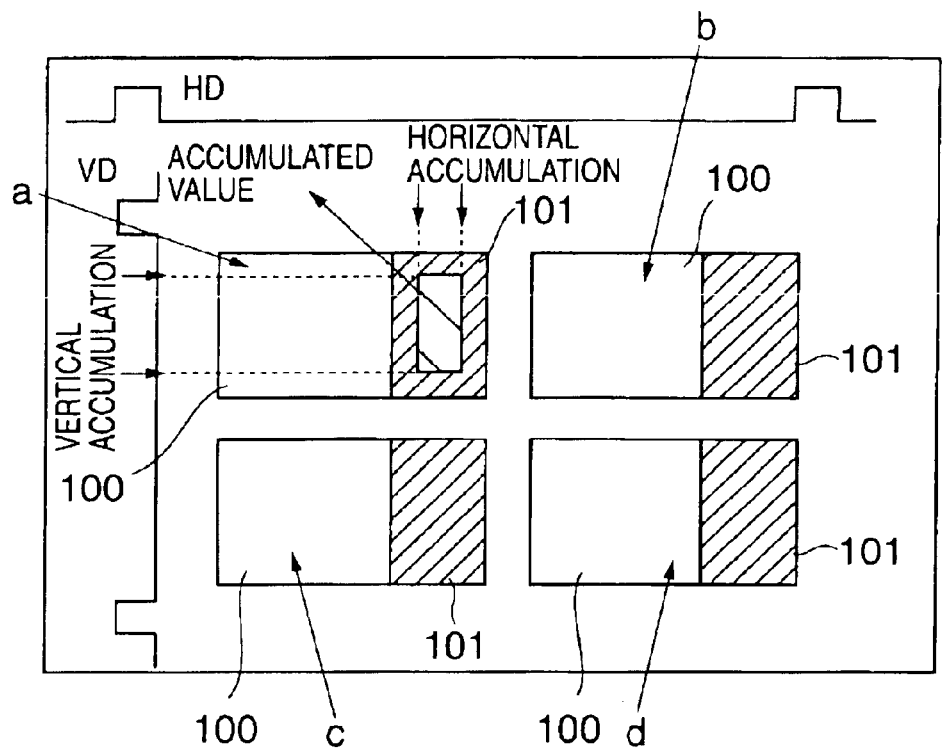
FIG. 5 illustrates still another embodiment of digital clamping processing according to the present invention.

Disclosed next with reference to FIG. 5 is that video signals appear twice for one HD and VD, compared to four times (n=4) for one VD in FIG. 4.

In FIG. 5, OB data for each of the portions "a", "b", "c" and "d" are accumulated and averaged in the horizontal direction and also in the vertical direction. The average values thus obtained are further accumulated and averaged to obtain average OB data. The average OB data is stored in the memory 450 and controlled according to the difference between the average OB data and digital video signal that appears for the succeeding VD.

FIG. 5 illustrates accumulation and averaging of OB data for the portions "a", "b", "c" and "d". However, not only this, but also, another processing, such as, accumulation and averaging of OB data for locations of the locations "a" and "b"; "a" and "c"; and "a" and "d"; "a", "b and "c"; "b" and "c"; "b" and "d"; "b", "c" and "d"; and "c" and "d", can be applied to digital clamping processing for reference (black) level setting for digital video signals.

Moreover, for digital clamping processing for a digital video signal carrying "n"דm" number of video data that have been read "n" times from the CCD 1 for one HD and read "m" times from the CCD 1 for one VD by high-speed photographing, designation of accumulation starting point and the number of lines for accumulation by the CPU 91 offers accurate digital clamping processing. Setting the number of line for accumulation to $2^n$ offers bit-shifting for OB data averaging, thus acheiving simple processing.

As disclosed above, the present invention offers a single digital clamping circuit for digital clamping of digital video signal carrying a plurality of video data for each field period with no special component for high-speed processing, such as high-speed CPU, thus achieving less generation of heat, less power consumption and less cost-up.

What is claimed is:

1. A method of controlling an image apparatus having a light-receiving section and a light-blocking section comprising the steps of:

receiving light from an object by the light-receiving section to generate a plurality of analog video signals for a first field period;

blocking the light by the light-blocking section to generate reference signals for each analog video signal;

converting the analog video signals into digital video signals;

accumulating the reference signals for each digital video signal to generate a first accumulated signal;

averaging the first accumulated signal to generate a first average signal;

accumulating the first average signal for all the video signals for a second field that follows the first field period to generate a second accumulated signal;

averaging the second accumulated signal to generate a second average signal; and adjusting a reference level of each digital video signal based on the second average signal so that the difference between the digital video signals and the second average signal becomes zero.

* * * * *